Jan. 4, 1944.  F. W. PETRI  2,338,455
THERMAL CONTAINER FOR LIQUIDS OR SOLIDS
Filed April 30, 1941  2 Sheets-Sheet 1

INVENTOR
FREDERICK W. PETRI
BY
ATTORNEY

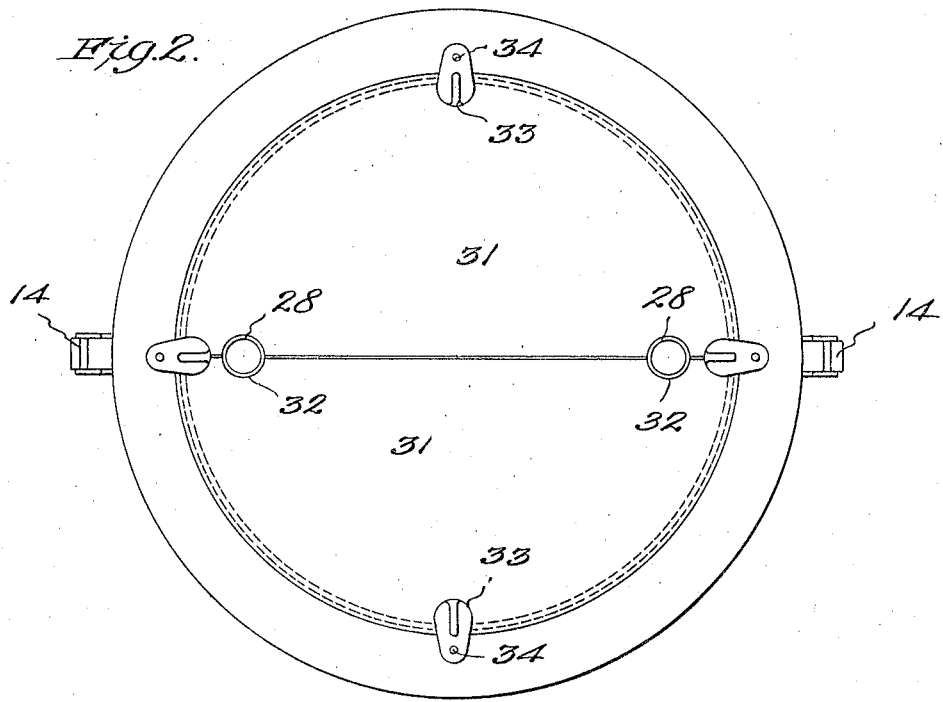
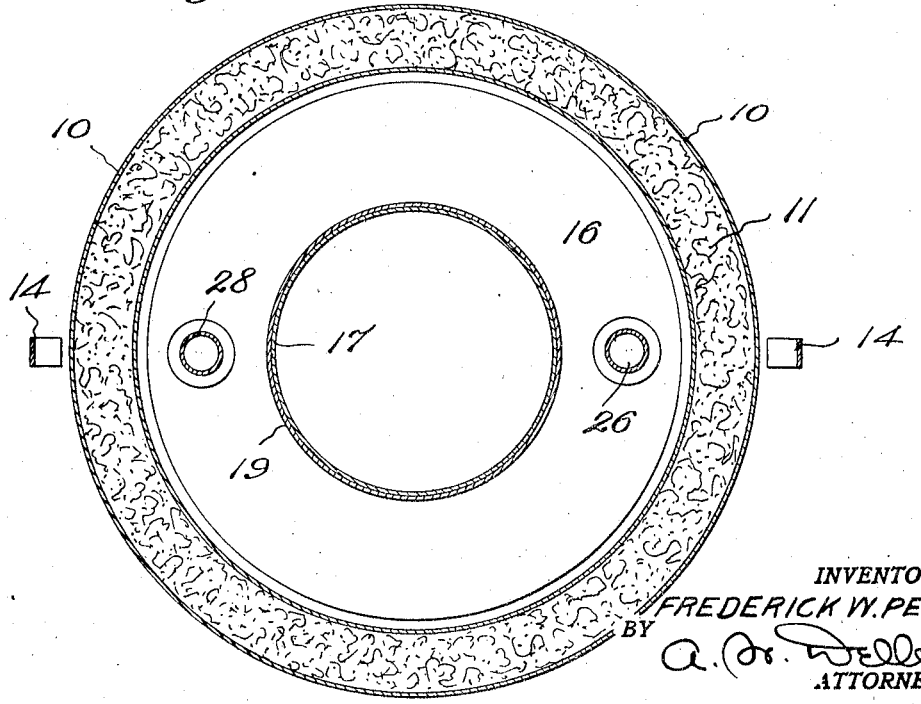

Patented Jan. 4, 1944

2,338,455

UNITED STATES PATENT OFFICE 2,338,455

THERMAL CONTAINER FOR LIQUIDS OR SOLIDS

Frederick W. Petri, Mahwah, N. J.

Application April 30, 1941, Serial No. 391,042

3 Claims. (Cl. 220—17)

The invention relates to thermal containers for liquids such as beverages, or solids such as foodstuffs, which are to be maintained in a heated or cooled condition for a period of time.

The object of the invention is to provide a container of the indicated type constructed in a novel manner to maintain the contents in a heated or cooled condition for relatively long periods of time without interference with the ready removal of said contents at will as may be required.

The invention contemplates primarily a container of the class mentioned in which the parts are capable of being readily disassembled and separated from each other to permit periodic thorough and efficient cleaning of the interiors of said parts, as may be desired or considered necessary.

Other objects will appear from the description hereinafter and the features of novelty will be pointed out in the claims.

In the accompanying drawings, which illustrate an example of the invention without defining its limits, Fig. 1 is a sectional elevation of the novel container;

Fig. 2 is a plan view with the outer cover of the container removed;

Fig. 3 is a horizontal section on the line 3—3 of Fig. 1, and

Figure 1:
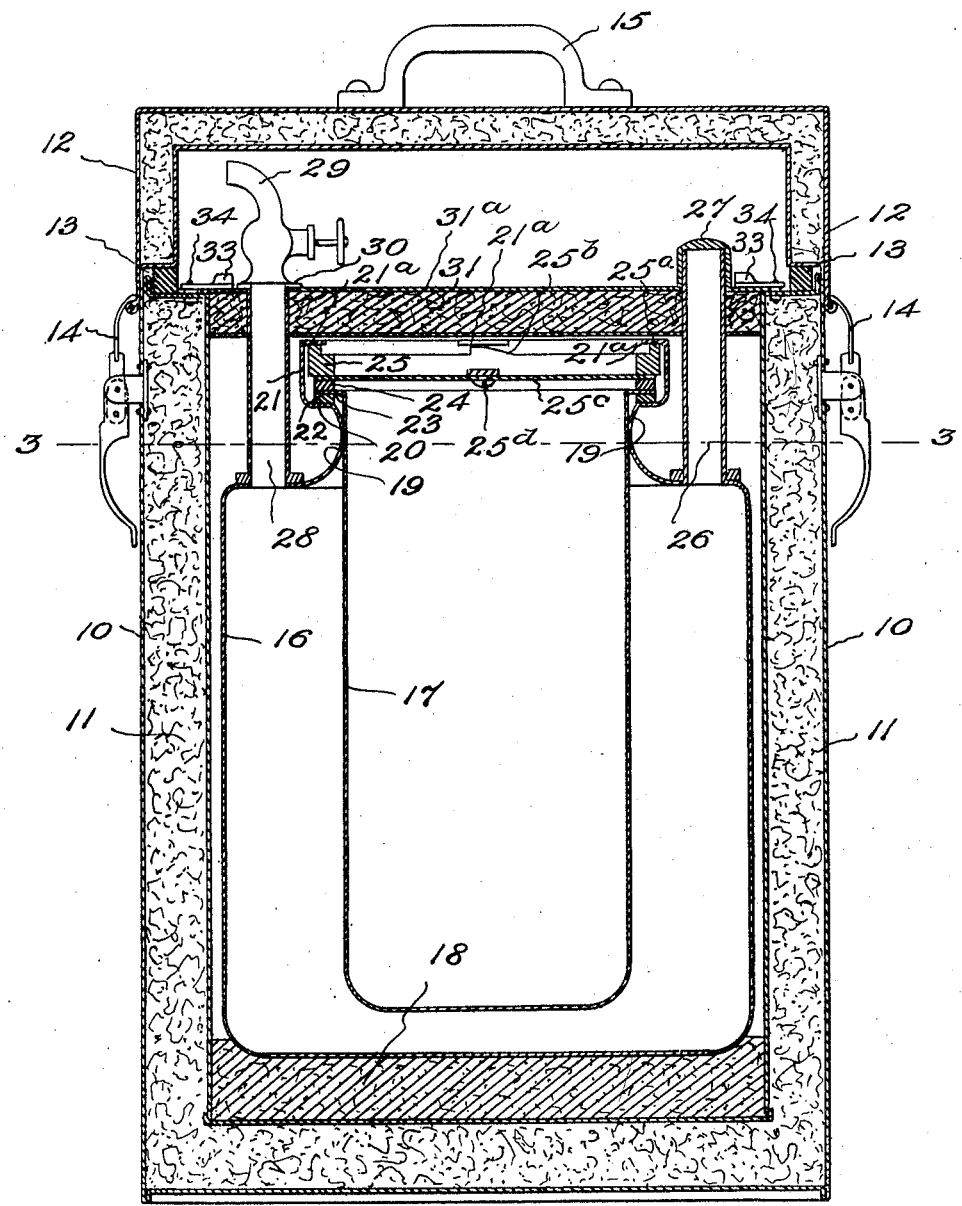

The novel container in its illustrated form comprises a double-walled casing or jacket 10 preferably of cylindrical shape and preferably made of a suitable metal. The casing or jacket 10 is constructed in a manner to provide an annular space containing a suitable insulating material 11 for the purpose of insulating said casing or jacket 10 against the rapid dissipation of heat or cold from the interior thereof. The insulation 11 may comprise any suitable material such as cellular rubber, cork, mineral wool, spun glass or any other commercial insulation. An insulated outer cover 12 is suitably combined with the casing or jacket 10 in a manner to be either completely removed therefrom or movably connected therewith so as to be capable of being adjusted to open and closed positions at will. In the preferred arrangement, a suitable sealing gasket 13 is located between the cover 12 and the annular upper surface of the casing or jacket 10 and suitable means, for instance in the form of releasable clamps 14, is provided on the casing 10 for detachably securing the cover 12 in its closed position on the casing or jacket 10 in such a manner that the entire container may be lifted and conveyed from place to place by means of the handle 15 with which said cover 12 may be provided.

Figure 4:
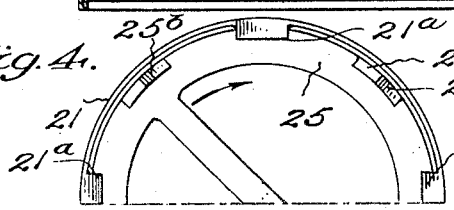
Fig. 4 is a fragmentary plan view of the upper end of an internal unit included in the novel container.

The device further includes an internal unit consisting of telescopically combined cylinders 16 and 17, said unit in the assembled condition of the device preferably resting on an insulating pad 18 of cellular rubber or the like. The latter itself rests upon the bottom of the casing or jacket 10 and avoids metal-to-metal contact between the latter and said internal unit, and also provides additional insulation against the dissipation of heat or cold. The outer cylinder 16 of the internal unit is formed with a reduced neck 19 and a horizontal outwardly projecting flange 20 from which an annular extension 21 projects upwardly as shown in Fig. 1. A gasket 22 of soft rubber or neoprene rests upon the flange 20 of the outer cylinder 16 of the internal unit and supports the outwardly extending horizontal flange 23 formed at the upper open end of the inner cylinder 17 of said internal unit, whereby said inner cylinder 17 is suspended telescopically in the outer cylinder 16 of said internal unit as illustrated in Fig. 1. The parts preferably are so dimensioned and arranged that the cylinder 17 terminates at a distance above the bottom of the outer cylinder 16 of said internal unit. A second gasket 24 similar to the gasket 22 rests upon the flange 23 and is engaged by a cover 25 which is detachably connected with the extension 21 in any convenient manner as by screwthreading or by means of a conventional bayonet joint. In the preferred arrangement the cover 25 is constructed in the form of a spider and is provided at spaced intervals with locking lugs 25ª having inclined camming surfaces 25ᵇ and co-operating with locking projections 21ª projecting inwardly from the annular extension 21 at spaced intervals as shown in Figs. 1 and 4. To facilitate the rotation of the cover 25 relatively to the gasket 24 and to avoid shifting or distorting of the latter, when said cover 25 is connected with and disconnected from the extension 21, said cover 25 is preferably provided with a metal or other suitable facing in the form of a disk 25ᶜ rotatably mounted on the lower face of the cover 25, for instance, by means of a screw 25ᵈ or the like, as shown in Fig. 1.

With this arrangement the disk 25ᶜ will rest upon the gasket 24 when the cover 25 is in place, and the latter will rotate on said disk 25ᶜ as said cover 25 is rotatably manipulated to connect it with or disconnect it from the locking projections 21ᵃ. As a result this manipulation of said cover 25 will have no tendency to disturb the gasket 24. As the cover 25 is rotated to lock it in place, the camming surfaces 25ᵇ of the locking lugs 25ᵃ will engage the locking projections 21ᵃ of the annular extension 21 and in co-operation therewith will force said cover 25 against the gasket 24 and finally permit the locking lugs 25ᵃ to pass beneath the locking projections 21ᵃ to thereby securely connect the cover 25 with the annular extension 21. At the same time, the gasket 24 will be compressed and in turn through the medium of the flange 23 will compress and bear against the gasket 22 to removably combine the inner cylinder 17 with the outer cylinder 16 of said internal unit. The cover 25 is preferably made of suitable plastic material and is arranged to lie substantially flush with the upper edge of the extension 21 when the parts of the internal unit are fully assembled. A filler tube 26 is mounted on and communicates with the interior of the cylinder 16 and has its upper end screw-threaded for the accommodation of a sealing cap 27, which, when slightly unscrewed, may admit air to the interior of the cylinder 16. A similar emptying tube 28 is mounted on the cylinder 16 and communicates with the interior thereof and at its upper end may be provided with any suitable type of valve controlled tap or faucet 29 preferably provided with an annular flange 30 as shown in Fig. 1. The illustrated tap or faucet 29 which includes the customary rotatable controlling valve requires the container to be placed on its side in order to enable the contents of the internal unit to be withdrawn, and obviously may be replaced by other well known forms of equivalent devices well known to those skilled in the art. For instance, instead of the tap or faucet 29 shown in Fig. 1, the cylinder 16 may be provided with a conventional tapping pump including a plunger operated in any convenient manner to withdraw the contents of the internal unit at will while the container is in its normal upright position. The internal unit comprising the cylinders 16 and 17 and associated elements is firmly clamped in place interiorly of the casing or jacket 10 by means of a removable inner cover 31 constructed and arranged to prevent undue radiation losses of heat or cold from within the device. The inner cover 31 is preferably made in two sections so as to be readily placed in position and is provided with recesses 32 adapted to fit the pipes 26 and 28 as shown in Fig. 2. The inner cover 31 may be made of any suitable material and is preferably constructed of cellular rubber having a backing of metal 31ᵃ bonded thereto in any convenient manner, said backing 31ᵃ preferably projecting outwardly beyond the cover 31 and extending over and in surface engagement with the end face of the casing 10 when the cover 31 is in its operative position as illustrated in Fig. 1. The inner cover 31 is removably fixed in said operative position by suitable clamps or catches 33 pivoted at 34 upon the upper annular surface of the casing or jacket 10, and preferably also by the flange 30 of the tap 29 and the cap 27 of the filler pipe 26. The arrangement and dimensions preferably are such that the clamps or catches 33 when in operative position and the flange 30 and cap 27 will compress the inner cover 31 into engagement with the top of the cover 25 of the internal unit. The latter will thereby be forced into firm contact with the insulating pad 18 at the bottom of the casing 10 to thereby firmly fix said internal unit in place in the casing or jacket 10 as clearly illustrated in Fig. 1.

In practice, the inner cylinder 17 of the internal unit may be utilized to contain hot solid food suitably packed in nested containers or otherwise, and a heating medium such as boiling water, or a hot beverage may be contained in the outer cylinder 16 of the internal unit so as to surround the inner cylinder 17 and thereby maintain the contents of the latter in a heated condition. In such case, the device may be used for maintaining the contents of the inner cylinder 17 in a heated condition and at the same time may provide a heated beverage such as hot coffee or tea in the cylinder 16 in the space thereof surrounding the inner cylinder 17. This hot beverage may be withdrawn from the outer cylinder 16 in the desired quantities at will by placing the container on its side and opening the faucet or tap 29, or by operating the previously mentioned conventional tapping pump while the container remains in its upright position. It will be understood, in either case, that the outer cover 12 has either been removed from the casing or jacket 10 or adjusted to an open position thereon prior to the operation of the faucet or tap 29 or the tapping pump or other equivalent device to withdraw the contents of the internal unit.

The inner cylinder 17 may also be utilized to contain cold food or other materials, while a cooling substance, such as ice water or any cold beverage may be contained in the outer cylinder so as to surround the inner cylinder 17 therein. In both of these instances the container serves the double purpose of maintaining food or other materials in a heated or cooled state and coincidentally provided a readily accessible supply of either hot or cold beverage.

In addition, the inner cylinder 17 may serve as a receptacle for either ice or Dry Ice for cooling a liquid contained in the outer cylinder 16 in the space surrounding said inner cylinder 17. Or the inner cylinder 17 may be filled with boiling water or other heating agent to supply heat for the purpose of maintaining the contents of the outer cylinder 16 in a heated condition. If Dry Ice is used for cooling purposes in the inner cylinder 17, it is preferable to provide the cover or screw-cap 25 with an automatic vent of suitable type to allow for the release of pressure created by the liberation of compressed carbon dioxide gas in such case.

The introduction of the liquids into the outer cylinder 16 may be effected through the filler pipe 26 while the contents of the inner cylinder 17 may be introduced through the upper open end thereof subsequent to the removal of the cover or screw-cap 25 therefrom.

When it is desired to do so, the internal unit may be completely removed from the casing or jacket 10 by first unlocking the clamps 14 and removing the outer cover 12 from said casing 10 or by adjusting it to an open position thereon, and then removing the inner cover 31 subsequent to the shifting of the clamps 33 to open inoperative positions. The entire internal unit may then be easily lifted from the casing or jacket 10 and itself may be dismantled by detaching and removing the cover 25 to thereby leave the inner cylinder 17 of the internal unit free to be easily lifted or withdrawn from the outer cylinder 16 thereof. Both the cylinders 16 and 17 may then be internally cleaned in an efficient manner without difficulty to thereby maintain the internal unit at all times in a clean and sanitary condition.

The internal unit consisting of concentric telescopically arranged cylinders 16 and 17 insures efficient action by the cooling or heating agents utilized therein, as the transfer of the heat or cold units must take place through the liquid in the outer cylinder 16 and through the insulation 11 of the outer casing or jacket 10 which surrounds the internal unit before said heat or cold units can be dissipated. As a result the container is effective for purposes of maintaining the contents in either a heated or cold condition for a maximum period of time.

The detachable combination of the cylinders 16 and 17 of the internal unit permits the latter to be readily separated at will for the purposes of cleaning the interiors thereof, thereby making this efficient method of temperature transfer available on a practical basis in an extremely simple manner.

Although the present invention has been described in conjunction with a preferred embodiment, it is to be understood that modifications and variations may be resorted to without departing from the spirit and scope of the invention, as those skilled in the art will readily understand. Such variations and modifications are considered to be within the purview and scope of the appended claims.

I claim:

1. A thermal container comprising an insulated casing having an open end, a movable insulated cover for normally closing said open end of said casing, movable locking means for locking said cover in the closed position, a resilient insulating pad interiorly of said casing on the bottom thereof, an internal unit removably contained within said casing and consisting of separate sections detachably connected with each other for disassembling to render the interiors of said separate sections accessible for cleaning, a resilient insulated inner cover fitting the open end of said casing in engagement with said inner unit, and means independent of said movable locking means for locking said inner cover in place under compression independently of said movable insulated cover whereby said internal unit is forced into compressive contact with said resilient insulating pad and clamped in place within said casing.

2. A thermal container comprising an insulated casing having an open end, a movable insulated cover for normally closing said open end of said casing, a resilient insulating pad interiorly of said casing on the bottom thereof, an internal unit removably contained within said casing and consisting of an outer cylinder resting on said resilient insulating pad, an inner cylinder telescopically suspended within said outer cylinder, a cap removably connected with said outer cylinder and engaging said inner cylinder to removably clamp the latter in said outer cylinder, a filler pipe and an emptying pipe communicating with the interior of said outer cylinder and projecting upwardly therefrom beyond the open end of said casing, a resilient insulated inner cover comprising two mating sections fitting the open end of said casing and provided with co-operating recesses fitting said pipes, and means for locking the sections of the inner cover in said open end under compression whereby said internal unit is forced into compressive contact with said resilient insulating pad and fixed in place within said casing.

3. In a thermal container of the kind described, an internal unit comprising an outer cylinder having an open end and a reduced neck, a horizonal annular flange projecting outwardly from said neck, an annular extension extending upwardly from said flange, a gasket resting on said horizontal flange, an inner cylinder having an open end, an outwardly projecting flange at the open end of said cylinder resting on said gasket, a second gasket resting on said outwardly projecting flange, a cover arranged to fit within the annular extension of said outer cylinder, a disk rotatably mounted on the inner face of said cover adapted to engage said second gasket and to constitute a bearing surface for said cover, and co-operating means on said annular extension and cover respectively arranged to be engaged with and disengaged from each other by rotative movement of said cover on said disk to lock and unlock the cover and to connect and disconnect the two cylinders with and from each other, the rotative movements of said cover being relative to said disk to prevent disturbance of said second gasket.

FREDERICK W. PETRI.